(12) United States Patent
Erhart et al.

(10) Patent No.: US 9,247,061 B2
(45) Date of Patent: Jan. 26, 2016

(54) ANSWER BASED AGENT ROUTING AND DISPLAY METHOD

(71) Applicant: Avaya Inc., Basking Ridge, NJ (US)

(72) Inventors: George Erhart, Loveland, CO (US); Valentine C. Matula, Granville, OH (US); David Skiba, Golden, CO (US)

(73) Assignee: Avaya Inc., Basking Ridge, NJ (US)

(*) Notice: Subject to any disclaimer, the term of this patent is extended or adjusted under 35 U.S.C. 154(b) by 0 days.

(21) Appl. No.: 13/833,453

(22) Filed: Mar. 15, 2013

(65) Prior Publication Data

US 2014/0270145 A1  Sep. 18, 2014

(51) Int. Cl.
*H04M 3/00* (2006.01)
*H04M 5/00* (2006.01)
*H04M 3/523* (2006.01)
*H04M 3/51* (2006.01)

(52) U.S. Cl.
CPC ............ *H04M 3/523* (2013.01); *H04M 3/5166* (2013.01); *H04M 3/5235* (2013.01); *H04M 2203/655* (2013.01)

(58) Field of Classification Search
CPC .. H04M 3/523; H04M 3/5183; H04M 3/5233
USPC ............. 379/265.13, 265.11, 265.12, 265.05, 379/265.01, 265.02; 705/10; 707/1
See application file for complete search history.

(56) References Cited

U.S. PATENT DOCUMENTS

| | | | |
|---|---|---|---|
| 7,487,095 B2 | 2/2009 | Hill et al. | |
| 8,000,973 B2 | 8/2011 | Williams et al. | |
| 8,331,550 B2 | 12/2012 | Erhart et al. | |
| 8,478,826 B2 | 7/2013 | Erhart et al. | |
| 8,644,487 B2 | 2/2014 | Erhart et al. | |
| 2002/0026435 A1* | 2/2002 | Wyss et al. | 707/1 |
| 2006/0195353 A1* | 8/2006 | Goldberg et al. | 705/10 |
| 2010/0235218 A1 | 9/2010 | Erhart et al. | |
| 2011/0010431 A1* | 1/2011 | Rooks et al. | 709/218 |
| 2011/0125550 A1 | 5/2011 | Erhart et al. | |
| 2011/0125580 A1 | 5/2011 | Erhart et al. | |
| 2011/0125697 A1 | 5/2011 | Erhart et al. | |
| 2011/0125793 A1 | 5/2011 | Erhart et al. | |
| 2011/0125826 A1 | 5/2011 | Erhart et al. | |
| 2011/0276513 A1 | 11/2011 | Erhart et al. | |
| 2011/0288897 A1 | 11/2011 | Erhart et al. | |
| 2012/0051526 A1 | 3/2012 | Erhart et al. | |

* cited by examiner

*Primary Examiner* — Thjuan K Addy
(74) *Attorney, Agent, or Firm* — Sheridan Ross P.C.

(57) ABSTRACT

A system can determine a best routing of a customer contact based on analysis of one or more automatically generated answers. A customer may provide an inquiry through a social media contact. The contact center can analyze the inquiry to generate one or more automated answers. The system then analyzes the automated answers. The analysis may include studying various attributes of the answer, either in relation to the inquiry or based in historical data. From the analysis, the system can modify the answers and/or provide a different or improved pool of agents to handle the contact. Thus, an improved set of answers and agents is provided for managing the contact.

20 Claims, 12 Drawing Sheets

ANSWER BASED AGENT ROUTING AND DISPLAY METHOD

BACKGROUND

Open ended communication channels into the contact center are growing in importance and use as consumers look to receive specific and direct answers to their issues, inquiries, and comments. These channels include email, chat, SMS, social media, etc. While they are important tools for consumers, supporting open ended dialog with customers is a difficult task for companies. The range of questions is endless, requiring a highly skilled agent on the company end to handle the interactions. This higher skilled agent is also a more expensive resource. Supporting these channels is important but it increases a company's cost. Furthermore, consistency of answers and information is more difficult. Incorrect information, slow response, and confusing replies are all dangers to the company when supporting these channels.

The company needs an efficient way to provide agents with proper, relevant, informative suggestions and in some cases automated replies to consumer questions over these channels.

SUMMARY

It is with respect to the above issues and other problems that the embodiments presented herein were contemplated. Embodiments presented herein provide systems and methods for determining a best routing of a customer contact based on analysis of one or more automatically generated answers. A customer may provide an inquiry through a social media contact. The contact center can analyze the inquiry to generate one or more automated answers. The system then analyzes the automated answers. The analysis may include studying various attributes of the answer, either in relation to the inquiry or based on historical data. From the analysis, the system can modify the answers, improve the pool of answers, and/or provide a different or improved pool of agents to handle the contact. Thus, an improved set of answers and agents is provided for managing the contact.

Given the current systems and algorithms for generating agent suggestions and automated responses the proposed embodiments introduce analysis to create, generate, and/or produce more useful answers and/or suggestions using the analysis of the automated or suggested answers as the basis for the agent selection. Generally, contact center base systems generated automated answers and/or suggestions based on by frame/slot/filler, knowledge base, or other systems and algorithms generally known and implemented in the industry.

The present system works by first generating an automated answer or a set of suggested responses for the agent to evaluate. With these automated or suggested responses, the system can check a number of steps to find a suitable agent to handle the request or receive the approval to send the automated response. A first attribute used for this determination can be the probability of the answer answering the question. The calculation of the probability may be performed though normal text processing classification methods, where each class of answer has a probability of answering the question. With the probability number, the agent routing system can decide not only who might get this question but also if the automated answer should be used without evaluation or if the item should go to an agent.

The next part of the method can use an answer complexity to compute a number used to route to the proper agent. Using standard text processing methods, classification techniques, and other methods, each answer is given a complexity score. The system then can attempt to match an agent's ability with the answer complexity of the generated answers. The concept is to find agents who can handle highly complex answers when required but have a much larger pool of agents that can handle simple items.

The agent threshold or ability score can be considered a vector with various entries based on classification of answers. Thus, an agent may have a higher threshold (can only answer items with a high confidence score) for service items but may have a low threshold for sales items (can use almost any lever of confidence score answers)

As a dynamic feedback loop for agent evaluation, the system can incorporate the activities of supervisor approval. Supervisor approval has seen an increase with social media or other public response. The data from the supervisor approval process can be used to determine not only answer quality but also agent skills. The metric of which type of agents handle which type, classification, or complexity of items well can be known over time and dynamically updated for a contact center. This metric can be used with the previous two metrics (probability and complexity) to get a complete picture of the proper route for a given answer.

Once a suitable agent is found for the incoming work item, the answer set/proposed answers go through another phase of analysis to optimize the final choices and display for the selected agent. The answer pool is then evaluated based on our newly developed criteria that analyzes the answer side of the question/answer problem. A first criteria used in reducing or reordering the answer pool may be the success rate of each given answer or source. Using metrics like first contact resolution, rating of the answer by the customers in post call surveys, the number of dialog turns after the answer is given, and possibly the frequency of use by an agent when suggested, a success rate may be calculated for an answer. In addition, this success rate metric may vary depending on the current outgoing channel selection.

The next criteria used in the evaluation may be a ranking of the relevance of the answer to the current trends monitored in a real-time channel, such as social media. This relevance metric can reorder responses to push the most relevant to the top, based on trends on the topic. When combined with the above, the agent suggestion or automated response generated is a most relevant answer that is most likely to succeed. Answers suggestions may also be reordered by their use by other agents. Answers used by more experienced agents would receive a higher score as those answers have been validated by being selected by better agents. The usage metric helps inexperienced agents learn the answers used by the experienced agents.

The final metric in use for the process evaluation is the goal of the answer. The goal may be defined in a three tier model of static answers, dynamic answers, and context required answers. When answers in the pool are static the likelihood of an effective answer is increased and shown to the agent over answers that are dynamic or require context information. This metric may be a weighting algorithm that impacts the score of the other two metrics.

Goal matching may use personal pronoun agreement. If the question is "your rates", then the question is second person, and the answer must be knowable by the receiver. If the customer is asking "my order", then the question is a first person request, and the answer must be specific to that person and their "order". The last category is the third party, would need to have been identified in the context of the dialog, and would have to have some relationship to either the customer or the business. The pronoun resolution metric can map into the tier model to be certain that generated answers or suggestions fit the correct response form.

With our answer focused analysis, the method can then reorder the pool of answers/suggestions based on the combined score of the above. In the case of suggestions, the new ordered results may be displayed for agent selection/modification. There is another optimization of the proposal where an automated answer is composed. In that case, similar analysis may be performed, but the routing decision is automated and the answer analysis for display is optimized to select the best answer. Note that depending on the analysis and review path, a variety of customer facing options may be used. The general forms of the communication channel may require notice to be issued to a customer in the event supervisor review or a less skilled agent is given the inquiry. The form of this notification may vary in content and form depending on the channel: email, SMS, chat, social media, etc.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate", and "compute," and variations thereof, as used herein, are used interchangeably and include any type of methodology, process, mathematical operation, or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects can be separately claimed.

The term "in communication with" as used herein refers to any coupling, connection, or interaction using electrical signals to exchange information or data, using any system, hardware, software, protocol, or format.

A user context, an extended user context, and/or a user social context as used herein means information about a user of a social media network that can be used to determine a "value" of that user.

The term "social media network" or "social media" is a service provider that builds online communities of people, who share interests and/or activities, or who are interested in exploring the interests and activities of others. Generally, social media are web-based and provide a variety of ways for users to interact, such as e-mail and instant messaging services.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. Various changes may be made in the function and arrangement of elements of the embodiment without departing from the spirit and scope of the appended claims.

Figure 1:
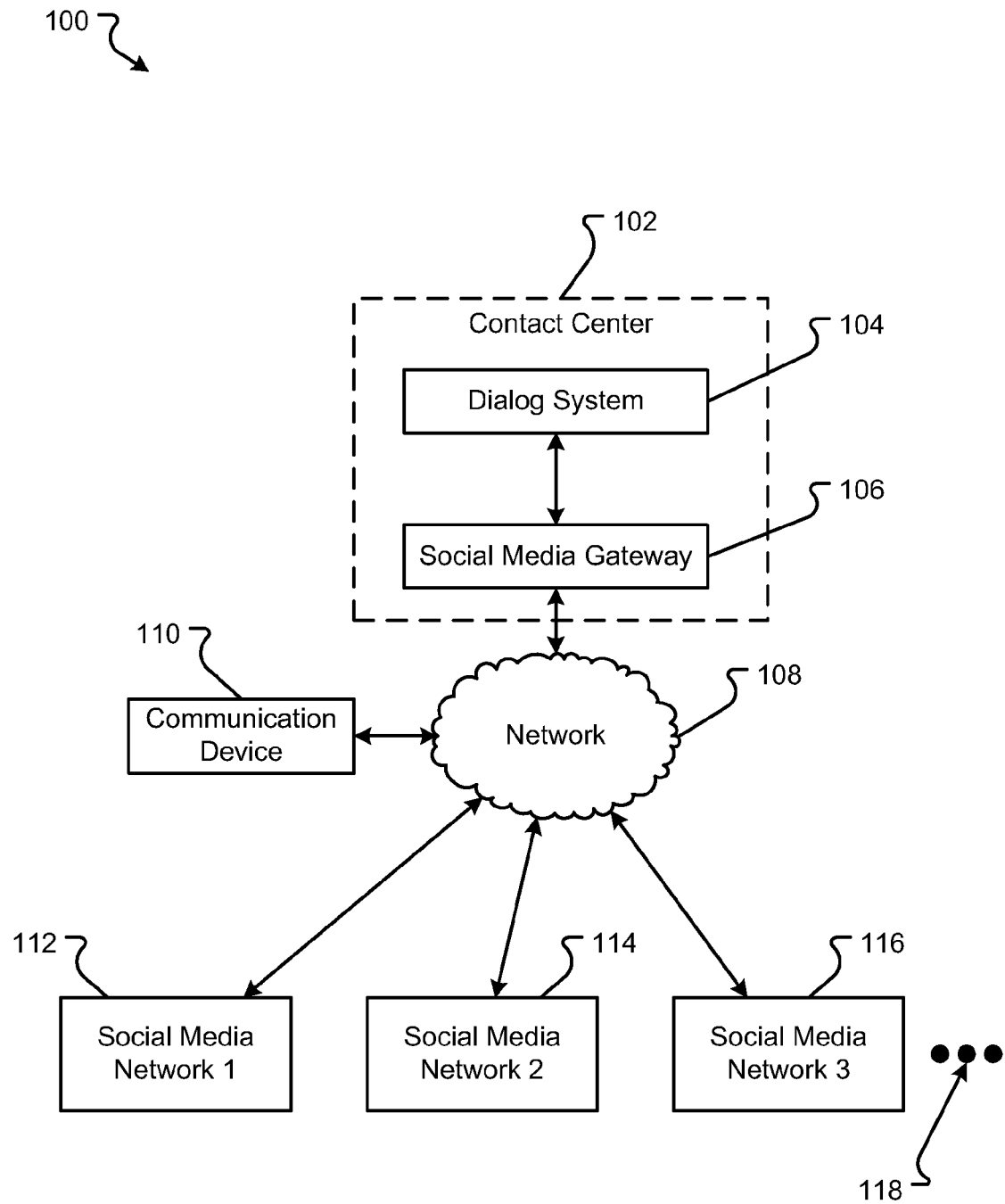
FIG. 1 is a block diagram of an embodiment of a communication system operable to interact with persons using a social media network.

A communication system 100, for interacting with persons using social media is shown in FIG. 1. The communication system 100 can include a contact center 102, a network 108, and one or more types of social media networks or systems, such as social media network 1 112, social media network 2 114, and/or social media network 3 116. Social media networks 112, 114, and/or 116 can be any social media including, but not limited to, networks, websites, or computer enabled systems. For example, a social media network may be MySpace, Facebook, Twitter, Linked-In, Spoke, or other similar computer enabled systems or websites. The communication system 100 can communicate with more or fewer social media networks 112, 114, and/or 116 than those shown FIG. 1, as represented by ellipses 118.

The network 108 can be any network or system operable to allow communication between the contact center 102 and the one or more social media networks 112, 114, and/or 116. The network 108 can represent any communication system, whether wired or wireless, using any protocol and/or format. The network 108 provides communication capability for the contact center 102 to communicate with websites or systems corresponding to the one or more social media networks 112, 114, and/or 116. However, the network 108 can represent two or more networks, where each network is a different communication system using different communication protocols and/or formats and/or different hardware and software. For example, network 108 can be a wide area network, local area network, the Internet, a cellular telephone network, or some other type of communication system. The network 108 may be as described in conjunction with FIGS. 8 and 9.

A contact center 102 can be a system that can communicate with one or more persons that use social media networking sites 112, 114, and/or 116. The contact center 102 can be hardware, software, or a combination of hardware and software. The contact center 102 can be executed by one or more servers or computer systems, as described in conjunction with FIGS. 8 and 9. The contact center 102 can include all systems, whether hardware or software, that allow the contact center 102 to receive, service, and respond to directed and non-directed contacts. For example the contact center 102 can include the telephone or email system, an interface to human agents, systems to allow human agents to service and respond to received contacts, and one or more systems operable to analyze and improve the function of agent interaction.

The contact center 102 may include a dialog system 104 and a social media gateway 106. While the dialog system 104 and the social media gateway 106 are shown as being a part of the contact system 102, in other embodiments, the dialog system 104 and/or the social media gateway 106 are separate systems or functions executed separately from the contact center 102 and/or executed by a third party. The dialog system 104 may process and receive messages. The social media gateway 106 can receive and translate messages from the one or more social media networks 112, 114, and/or 116. An embodiment of the dialog system 104 is described in conjunction with FIG. 2B. An embodiment of the social media gateway 106 is described in conjunction with FIG. 2A.

The contact center 102 may also communicate with one or more communication devices 110. The communication devices 110 can represent a customer's or user's cell phone, email system, personal digital assistant, laptop computer, or other device that allows the contact center 102 to interact with the customer. The contact center 102 can modify a non-direct contact, from a social media network 112, 114, and/or 116, into a directed contact by sending a response message directly to a customer's communication device 110.

Figure 2A:
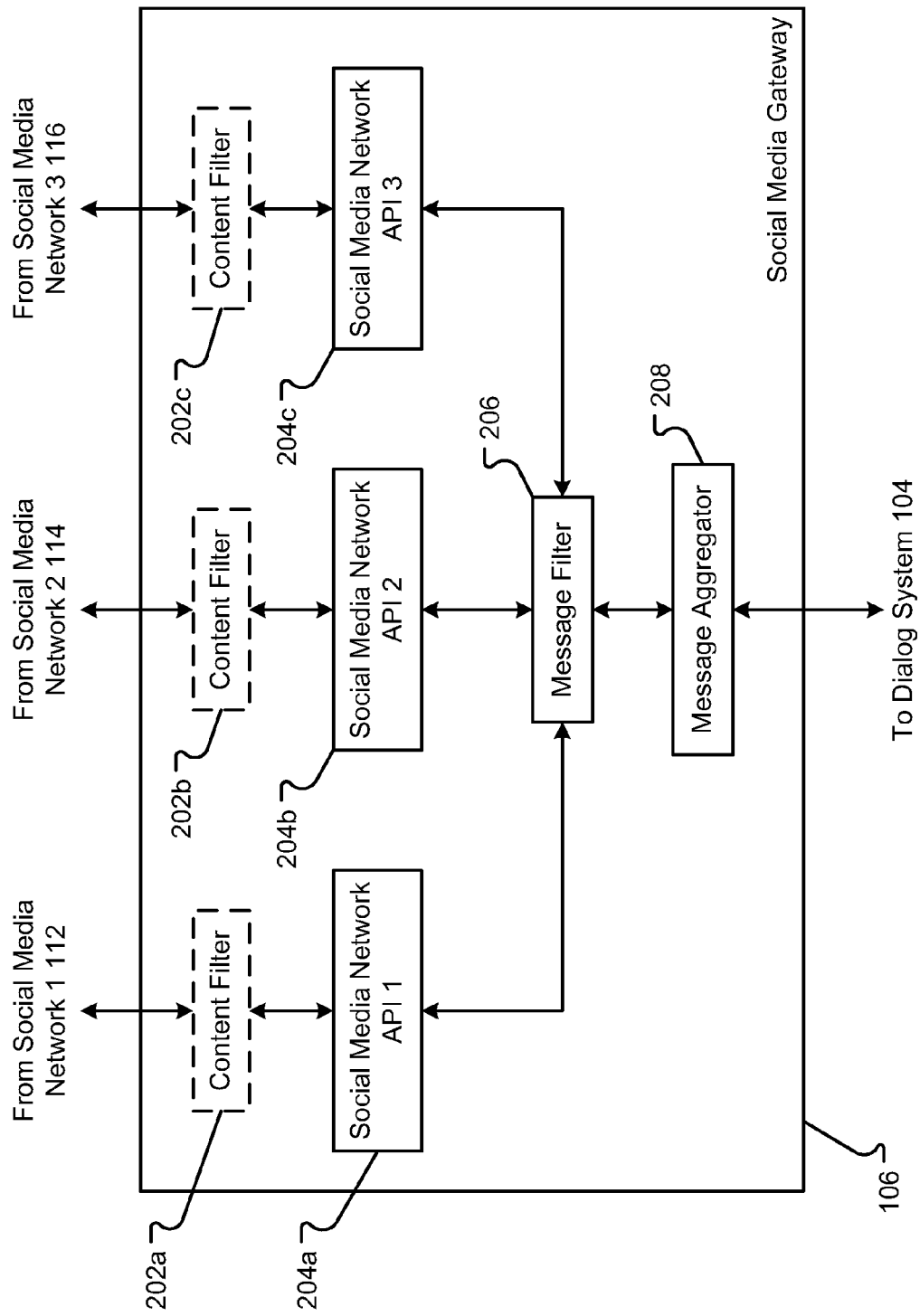
FIG. 2A is a block diagram of an embodiment of a social media gateway.

An embodiment of the social media gateway 106 is shown in FIG. 2A. The social media gateway 106 can include one or more components which may include hardware, software, or combination of hardware and software. The social media gateway 106 can be executed by a computer system, such as those described in conjunction with FIGS. 7 and 8. However, in other embodiments, the components described in conjunction with FIG. 2A are logic circuits or other specially-designed hardware that are embodied in a field programmable gate array (FPGA) application specific integrated circuit (ASIC), or other hardware.

Herein, the social media gateway 106 can include one or more content filters 202a, 202b, and/or 202c. A content filter 202 can receive all of the messages for the contact center 102 from a social media network 112, 114, and/or 116 and eliminate or delete those messages that do not require a response. For example, a message between two friends on a Facebook page, if not pertaining to a product or a service of the company operating the contact center 102, may not need a response. As such, the content filter 202 can filter out or delete the non-suitable message from the messages that are received by the social media network application programming interface (API) 1 204a, social media network API 2 204b, and/or social media network API 3 204c. With the content filter 202, the social media network API 204 only needs to translate those messages that should be received by the dialog system 104. Translation typically requires the conversion of the message into a different format.

The content filter 202 is provided with one or more heuristics for filter rules from a filter database (not shown). These filter rules can be created by the external customer or internal user (e.g. agent or administrator) of the communication system 100. Thus, the user or customer of the communication system 100 can customize the filtering of messages from social media networks 112, 114, and/or 116. Further, different rules may be applied to different social media networks 112, 114, and/or 116, as some social media networks 112, 114, and/or 116 may have different types of messages or postings than other types of social media networks 112, 114, and/or 116. While the content filter 202 is shown as part of the social media gateway 106, it is to be appreciated that the content filter 202 may be a part of the social media network API 204. The content filter 202 may correspond to query terms used by the social media network API 204. The content filter 202 or query terms are an argument to the social media network API 204 call.

The social media network API 204 can be an application that the social media network 112, 114, and/or 116 provides to access the social media network 112, 114, and/or 116. Thus, the social media network API 204 is called and connects the social media gateway 106 to the social media network 112, 114, and/or 116. Any suitable filter criteria may be employed for social media API 204. Examples of filter criteria include positive content of positive the source of posting, an address field, destination or recipient address fields, a time stamp field, a subject matter field, and a message body field. For example, a type of searchable content can be name of the business enterprise running or employing the contact center 102 and/or the products or services of the enterprise.

The social media gateway 106 can include one or more social media network APIs 204. As shown in FIG. 2A, the social media gateway 106 may include a social media network API 204 for each social media network 112, 114, and/or 116. As such, the social media gateway 106 can interact with each social media network 112, 114, and/or 116 in the particular (often unique) format or protocol used by the social media network 112, 114, and/or 116. Further, when new social media networks are created, the social media gateway 106 can be easily expanded to interact with those social media networks by adding another social media network API 204. Where social media networks 112 are more standardized, or use substantially similar formats or protocols, a single social media network API 204 can be shared by multiple social media networks 112-116.

The social media network API 204 can receive messages from and send messages to the social media network 112, 114, and/or 116. The social media network API 204 can translate a message received from a social media network 112, 114, and/or 116 and send the translated message to a message filter 206. The social media network API 204 can translate the received message into a standard formatted file. For example, the translated message may be represented by an extensible mark-up language (XML) file or other file having a general format. As such, each specific and particular social media network message can be translated into a standard format for use by the dialog system 104. Further, the social media network API 204 can receive a generally or standard format response message, from the dialog system 104, and translate that response into a particularly or specifically formatted response message that can be posted to the corresponding social media network 112, 114, and/or 116.

Messages to the contact center 102 are addressed to the contact center 102. For example, a customer may become a "friend" of the contact center 102 on a social media network 114, such as Facebook. The customer may then address a message to the contact center 102 on Facebook. This non-direct contact is a message that is not sent directly to the contact center 102 but to the contact center's Facebook page. In other embodiments, the contact center 102 receives messages not addressed to the contact center 102. For example, the contact center 102 can receive tweets from Twitter that are "broadcast" rather than addressed to the contact center 102. The contact center 102 may also search for messages or content on the social media networks 112, 114, and/or 116. Exemplary search criteria include customer name, customer profession, customer home address, customer business address, customer employer name, customer educational or professional background, customer hobby, personal or business interests, customer family profile, and the like. Thus, the social media gateway 106 of the contact center 102 can query, gather, or connect to a live feed of data from a social media network 112, 114, and/or 116 and then apply a filter to the indirect information.

Further, the social media network API 204 can also retrieve user context or other extended information from the social media networks 112, 114, and/or 116. User context or other extended information can include historical posts, historical tweets, or other historical communications that a user may have received or sent. Further, user context or other extended information can include, but is not limited to, account information for a user, the user's followers or friends, information on where historical messages were posted (e.g., geo-location, time/date, what type of device, etc.), trending analysis that the social media network 112, 114, and/or 116 might provide the user, etc. Thus, the social media network API 204 can retrieve information that is associated with a user and a social media network 112, 114, and/or 116 but not necessarily a part of a current message. The social media network API 204 is a gatherer of data, which can be used to determine a value for the user of the social media networks 112, 114, and/or 116.

The translated messages from the social media network API 204 can be received by a message filter 206. A message filter 206 can perform some or all of the functions of the content filter 202 and eliminate messages before being sent to the dialog system 104. However, in other embodiments, the message filter 206 eliminates information from within the messages before the redacted messages are sent to the dialog system 104. For example, a message from a social media network 112 may have three or four interactions between two parties not associated with the contact center 102. Only one of the several postings may be pertinent to the dialog system 104. As such, the message filter 206 can eliminate or delete at least a portion of the other messages for the dialog system 104. Thus, the dialog system 104 receives a message where some of the content of the message has been deleted. The message filter 206 can retrieve heuristics or filter rules from a filter database (not shown), similar to the content filter 202. A substantial difference between the content and message filters 202 and 206 is that the content filter 202 is specific to a particular message format associated with a corresponding social media network 112, 114, and/or 116, while the message filter 206 is applied to a standardized or universal format and is therefore common to multiple social media networks 112, 114, and/or 116. One skilled in the art will understand the type of rules that may be used to filter information from messages such that only pertinent questions, facts, requests, or information is sent to the dialog system 104.

A message aggregator 208 may also be included with the social media gateway 106. A message aggregator 208 can, in contrast to the message filter 206, combine two or more messages into a packet or grouping that is sent to the dialog system 104. Therefore, the message aggregator 208 can interrelate or combine messages based on information within the messages. For example, two messages may be combined based on any of the message fields referenced above, such as the person that posted the message, the subject, the request or question asked, the person the message was sent to, or other information that may be pertinent to the dialog system 104. Thus, the dialog system 104 may be able to respond concurrently to two or more messages based on a grouping provided by the message aggregator 208. Regardless of whether the messages are aggregated, each message or grouping of messages can be sent from the social media gateway 106 to the dialog system 104.

The social media gateway 106 can also send responses back to the social media networks 112, 114, and/or 116. A response from an agent in the contact center 102 can be sent to the social media gateway 106. The response may be in a general format and translated. The translated response may then be posted to the appropriate social media network 112, 114, and/or 116 by the social media gateway 106. In other embodiments, the agent may post the response directly to the social media network 112, 114, and/or 116 without sending the response to the social media gateway 106.

Figure 2B:
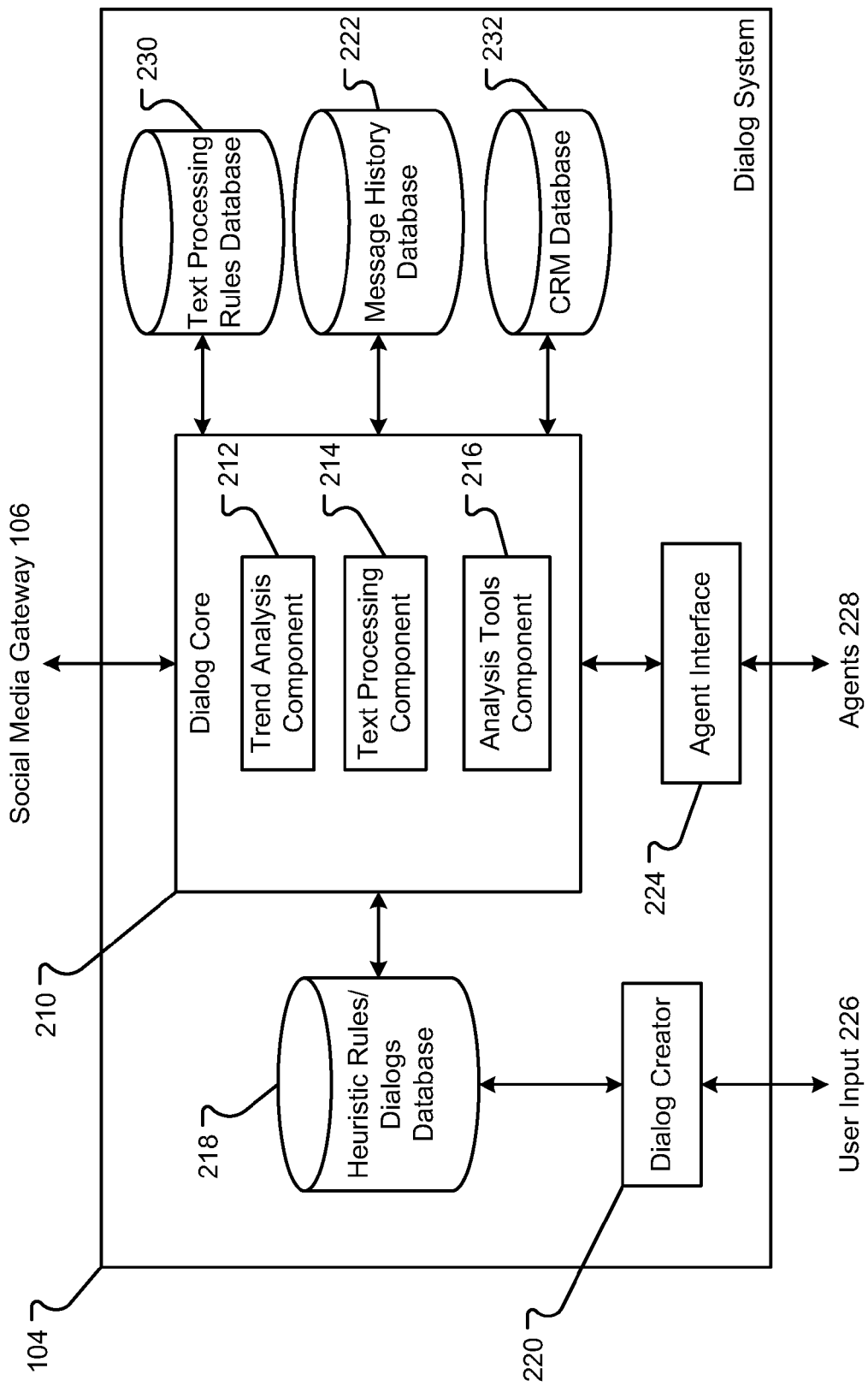
FIG. 2B is a block diagram of an embodiment of a dialog system.

An embodiment of the dialog system 104 is shown in FIG. 2B. The dialog system 104 can include one or more components which may be hardware, software, or a combination of hardware and software. The dialog system 104 can be executed by a computer system such as those described in conjunction with FIGS. 8 and 9. However, in other embodiments, the components described in conjunction with FIG. 2B, are logic circuits or other specially-designed hardware that are embodied in a FPGA or ASIC. The components contained within the dialog system 104 can include a dialog core 210 that is communication with a message history database 222, an agent interface 224, and a heuristic rules and dialogs database 218. Further, the heuristic rules and dialogs database 218 can be in communication with a dialog creator 220.

The dialog core 210 can include one or more sub-components. For example, the dialog core 210 can include a trend analysis component 212, a text processing component 214, and an analysis tools component 216. These components, similar to the components for the dialog system 104, can be hardware, software, or combination of hardware and software. The dialog core 210 may step through the states of a dialog data structure. A dialog data structure can include a set of inputs and associated actions that can be taken which allow for the automatic and structured response to social media requests or messages. For example, if a user asks for a manual, the input of the text word "manual" can cause the dialog system 104 in accordance with a dialog data structure, to send information about one or more manuals. In turn, the receiver of the response may respond, in kind, with the selection of a certain user manual. In which case, the dialog data structure may then instruct the dialog core to send the user to a website where the user can retrieve an electronic version of the manual. As such, the dialog data structure provides a script a dialog that allows the dialog core 210 to automate the interaction between the contact center 102 and a person. This automation eliminates the need for agent involvement, in some situations, and makes the contact center 102 more efficient and more effective. Further, the automation expands the contact center's ability to answer numerous messages from the plethora of postings on the numerous social media networks 112, 114, and/or 116.

The dialog creator 220 will create a dialog data structure 300 that includes instructions for various states for each social media message that comes into the contact center 102. The first instruction might be to send the social media message to the trend analysis component 212, then to the text processing component 214, and then execute a query of a Customer Relationship Management (CRM) database 232 (to determine if this user has an existing order). A CRM database 232 can be a database as described in conjunction with FIGS. 8 & 9 and can store information about customers or other data related to customer relations. Finally the dialog data structure 220 might decide that the social media message should be sent to a human agent 228 for processing. The instructions or node transitions are executed in the dialog core 210 and make use of many different components that the dialog creator 220 combines in any way the user desires to handle the social media messages. The dialog core 210 can make use of the trend analysis component 212, text processing component 214, or other systems. The dialog core 210 may also interface with a CRM system and/or database 232, external databases, social media user information (e.g., followers, friends, post history, etc. from the social media site), or other systems.

The trend analysis component 212 is operable to analyze trends that occur between two or more messages received by the social media networks 112, 114, and/or 116. The two messages can be from different social media networks, so that the trend analysis component 212 can identify trends across several different social media networks 112, 114, and/or 116. Trends can include multiple occurrences of the same word or phrase, multiple occurrences of a customer identity, product name or service, or multiple occurrences of some other information that might indicate a trend. Further, the trend analysis component 212 may be able to identify escalations in the occurrences of particular text, identities, or other information, or may identify multiple occurrences over a period of time. The trend analysis component 212 may also be able to apply one or more different algorithms to occurrences of information within the social media networks 112, 114, and/or 116. For example, the trend analysis component 212 can match the number of occurrences of a phrase or word over a period of time and apply analysis to determine if the occurrences are increasing or decreasing over the period of time.

The text processing component 214 is operable to analyze text of one or more messages from social media networks 112, 114, or 116. Some possible methods for text processing can include Regular Expression, Latent Semantic Indexing (LSI), text part of speech tagging, text clustering, N-Gram document analysis, etc. In addition, for possibly longer documents, (such as, blogs or emails), the text processing component 214 may execute one or more methods of document summarization. The summarization may occur if the social media message will be sent to an agent 228 of the contact center 102; the summarization can reduce the amount of information that the agent 228 may manage. The text processing rules or models may be stored in and/or retrieved from a text processing rules database 230. The text processing rules database 230 can be a database as described in conjunction with FIGS. 7 and 8 that stores rules or models used by the text processing component 214.

The text processing component 214 can identify one or more occurrences of a particular text, such as using one or more of the message fields referenced above, in order to associate that social media message with one or more dialogs data structures in the heuristic rules and dialog database 218. For example, the text processing component 214 can look for the word "manual," in the social media message. If the word "manual" is found, the text processing component 214 may retrieve a dialog data structure from the heuristic rules and dialogs database 218 and, as the dialog data structure instructs, communicate with the customer about one or more owner's manuals, repair manuals, or other types of manuals. In another example, if the social media message includes the words, "buy", "sell", "price, "discount" or other types of words that may indicate the user or customer wishes to buy a product, the text processing component 214 can retrieve one or more dialog data structures from the heuristic rules and dialogs database 218 that can provide instruction to assist the customer in purchasing products or services from the enterprise.

The analysis tools component 216 is operable to analyze response messages received back from an agent interface 224. In analyzing the agent's responses, the analysis tools component 216 can determine if the dialog data structures originally retrieved by the text processing component 214 met the needs of the customer. In the analysis, the agent 228 may enter one or more items of information, for the analysis tools component 216, about the response and about how the response matched with the dialog data structures. The analysis tools component 216 can review the response and determine if it was similar to the response provided by the dialog data structure. Thus, the analysis tools component 216 can provide information to the dialog core 210 or the dialog creator 220 to improve the dialog data structures that are included in the heuristic rules and dialogs database 218.

Figure 8:
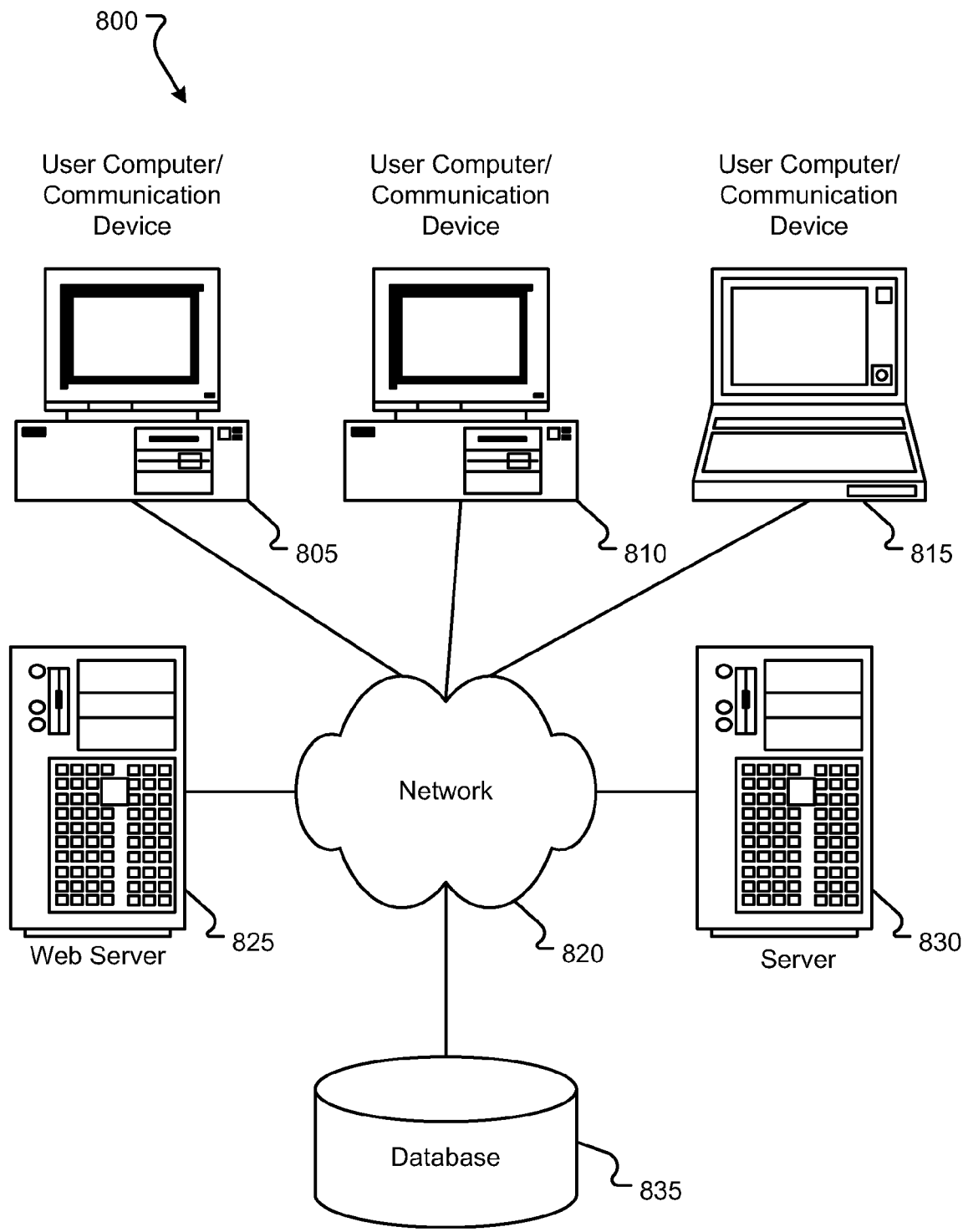
FIG. 8 is a block diagram of an embodiment of a computing environment.
Figure 9:
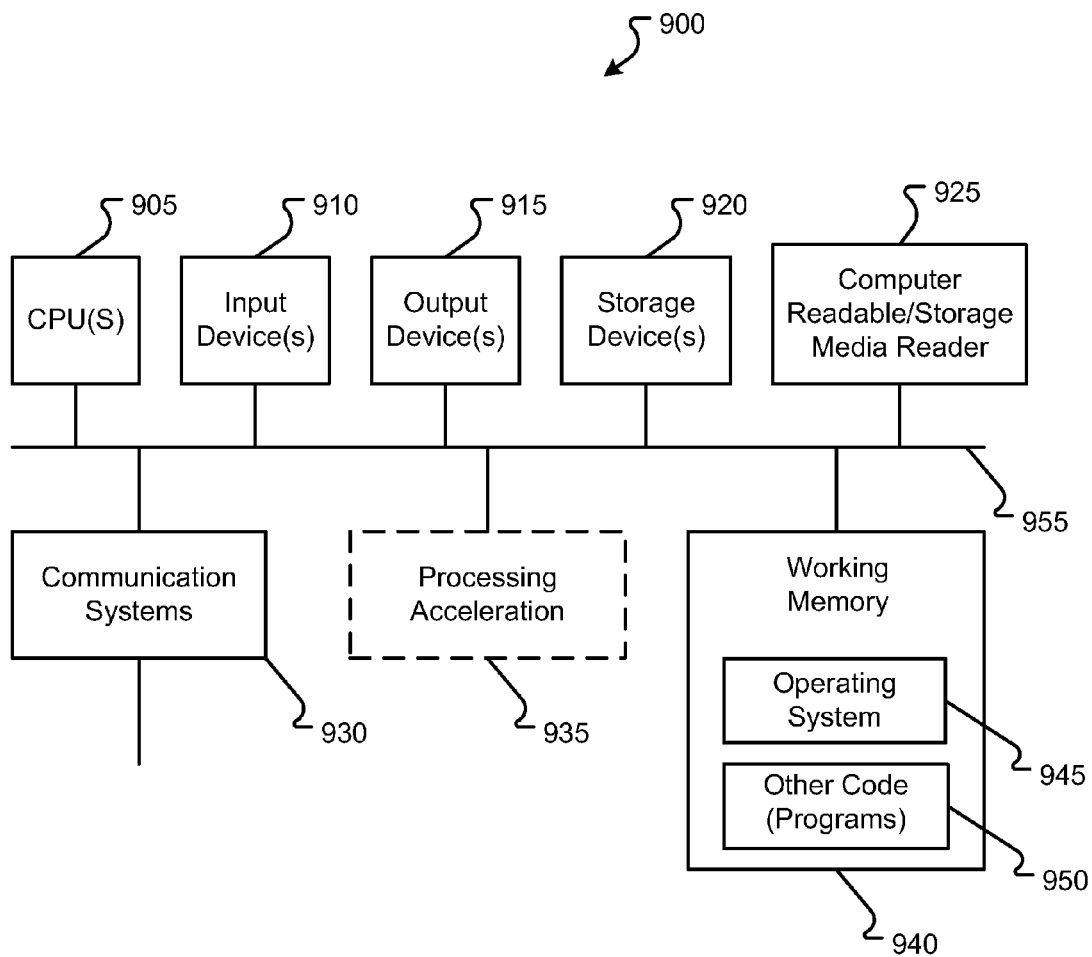
FIG. 9 is a block diagram of an embodiment of a computer system.

The message history database 222 can be any database or data storage system as described in conjunction with FIGS. 8 and 9. Thus, the message history database 222 can store data in data fields, objects, or other data structures to allow other systems to retrieve that information at a later time. The message history database 222 can store previous messages or information about previous messages. Thus, for example, if the trend analysis component 212 is analyzing several messages over a period of time, the trend analysis component 212 can retrieve information about previous messages associated with the current analysis from the message history database 222. As such, the trend analysis component 212 can better detect trends occurring at the social media networks 112, 114, and/or 116. The data stored by the message history database 222 can include the entire message or only a portion of the message, and in some circumstances, include metadata about the message(s).

The heuristic rules and dialogs database 218 can be any type of database or data storage system as described in conjunction with FIGS. 8 and 9. The heuristic rules and dialogs database 218 can store information in data fields, data objects, and/or any other data structures. The heuristic rules and dialogs database 218 stores rules and dialogs data structures that automate responses to received social media messages. The dialogs data structures control the interaction between the dialog core 210 and the social media network 112, 114, and/or 116. The dialogs or heuristic rules can be created by a dialog creator 220. Thus, the dialog creator 220 can interface with user input 226 to receive information about dialogs. The user input 226 is then used to form the states and responses for a dialog data structure.

An agent interface 224 is a communication system operable to send action items to contact center agents 228, in the contact center 102. An agent can be a person or other system that is operable to respond to certain questions or requests from a customer. For example, the agent 228 can be a person that has specialized expertise in a topic area, such as technical support. The agent interface 224 can format the social message into an action item and forward that message to one or more agents 228. The agent interface 224 can also receive response(s) back from the agents 228. The information provided by the agent 228 may be used by the dialog core 210 to complete a response to the social media message. For example, the information may classify the social media message (e.g., sales, service, etc.). In other embodiments, the response is a complete response to the social media message that can be posted to the social media network 112, 114, and/or 116. It should be noted that the answer based agent routing described hereinafter may be implemented in other types of call center or customer service centers other than that previously described. Thus, the answer based agent routing systems and methods described hereinafter are not limited to the social media call center described above.

Figure 3A:
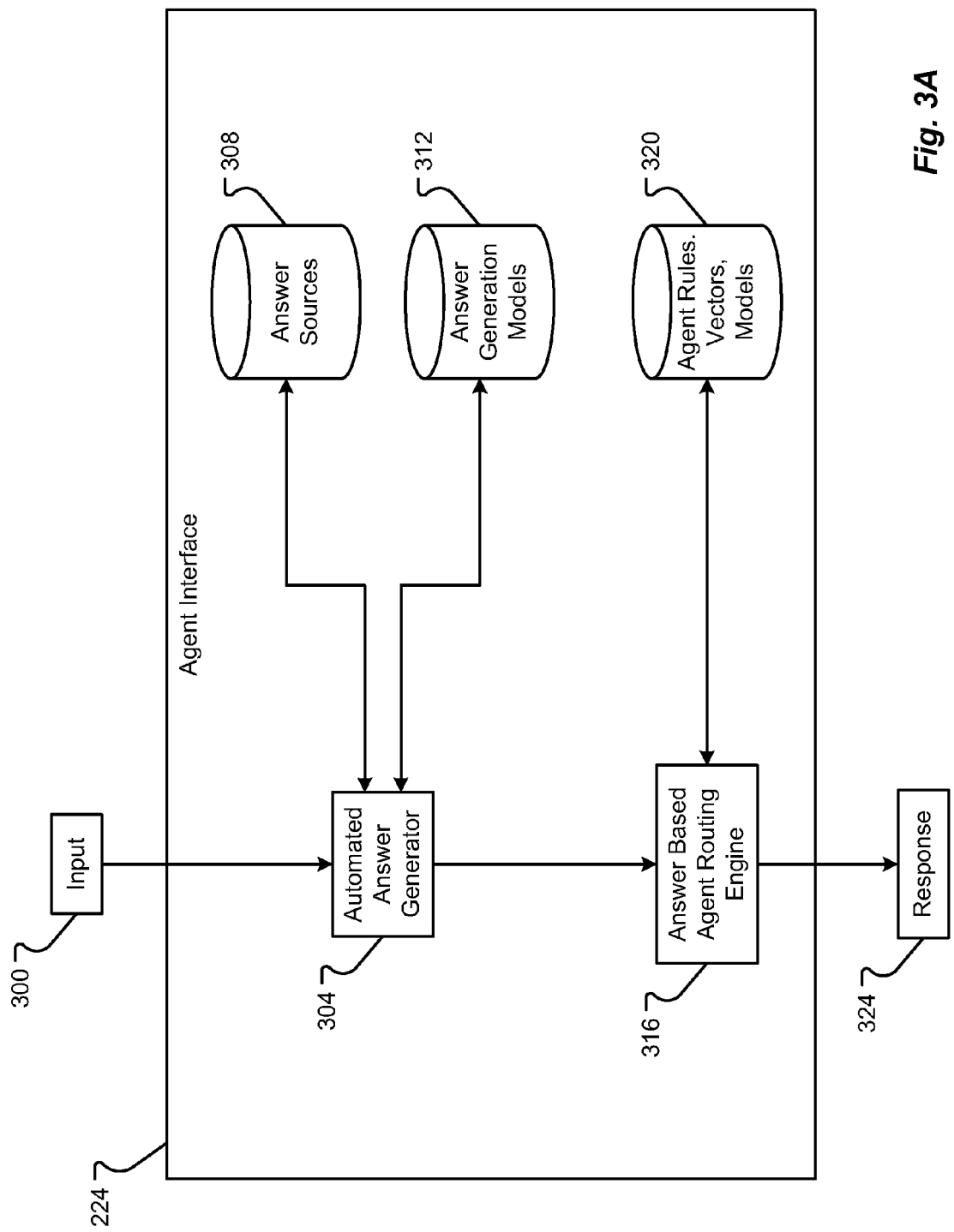
FIG. 3A is a block diagram of an embodiment of an agent interface.

An embodiment of the agent interface 224 is shown in FIG. 3A. The agent interface 224 can include one or more components or modules which may be hardware, software, or a combination of hardware and software. The agent interface 224 can be executed by a computer system such as those described in conjunction with FIGS. 8 and 9. However, in other embodiments, the components described in conjunction with FIG. 3A, are logic circuits or other specially-designed hardware that are embodied in a FPGA or ASIC. The agent interface 224 can include an automated answer generator 304 and an answer based agent routing engine 316. The automated answer generator 304 and the answer based agent routing engine 316 can access, manage, and store to one or more databases or data stores including, but not limited to, an answer sources database 308, an answer generation models database 312, and/or an agent rules, vectors, models database 320. Each of these modules will be explained further hereinafter.

The automated answer generator 304 can receive an input 300 from the dialog core 210 or other contact center component. The input 300 may include a query and/or any other information associated with a contact with a customer. Once an input 300 is received the automated answer generator 304 can apply an answer generation model from the answer generation models database 312. An answer generation model is a set of heuristics or other structure to determine an answer to a query based on information in or about the query. Answer generation models are well known in the art and are not discussed further herein.

Based on the application of the answer generation model, the automated answer generator 304 can select and answer from an answer sources database 308. The answer sources database 308 may include one or more answers that were previously developed. An answer can be modified from its original format or content in the answer sources database 308 to apply to the particular query that has been received. The generation, storage, and application of pre-defined answers in contact centers are well known and will not be described further.

Figure 3B:
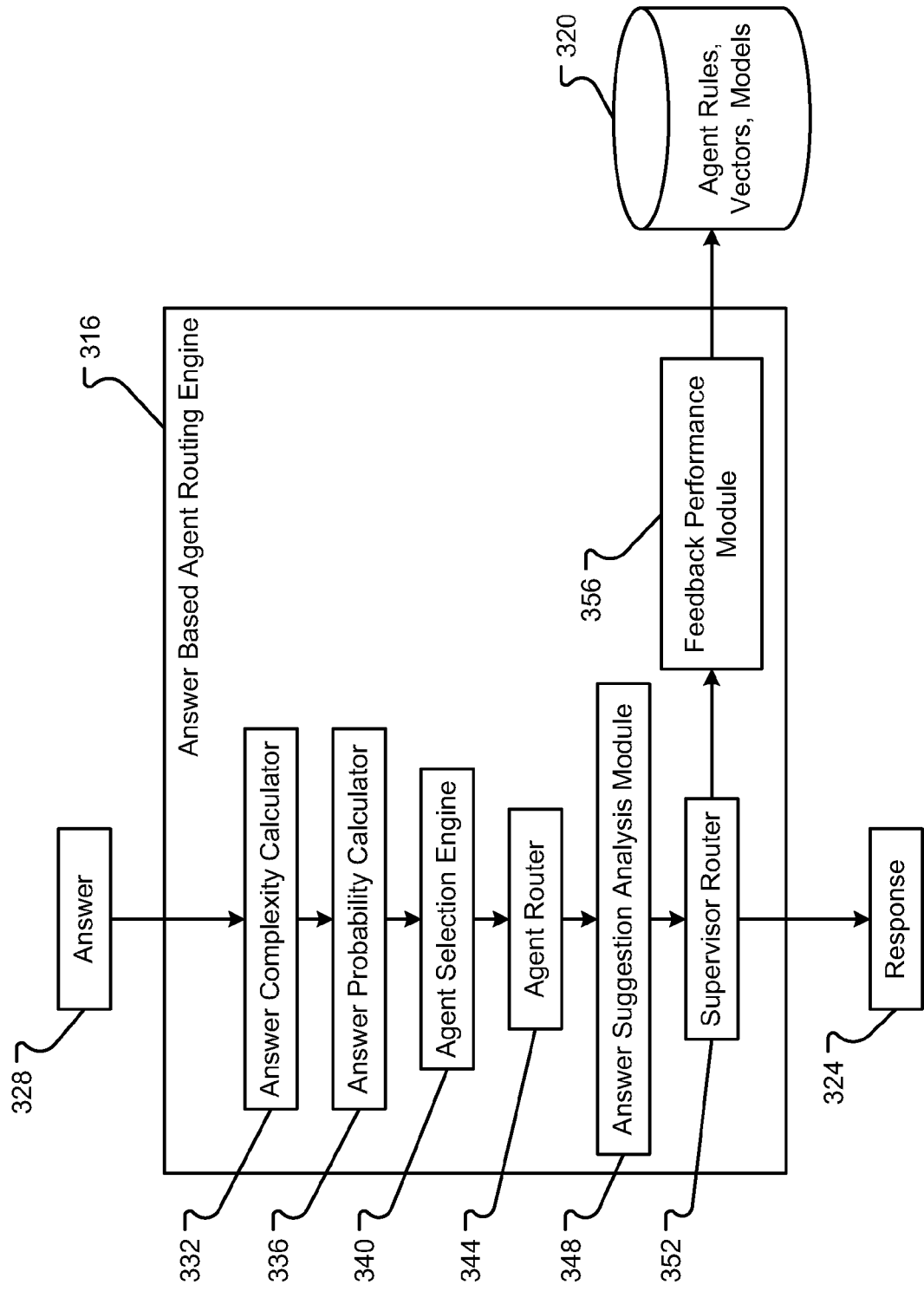
FIG. 3B is a block diagram of an embodiment of an answer based agent routing engine.
Figure 4:
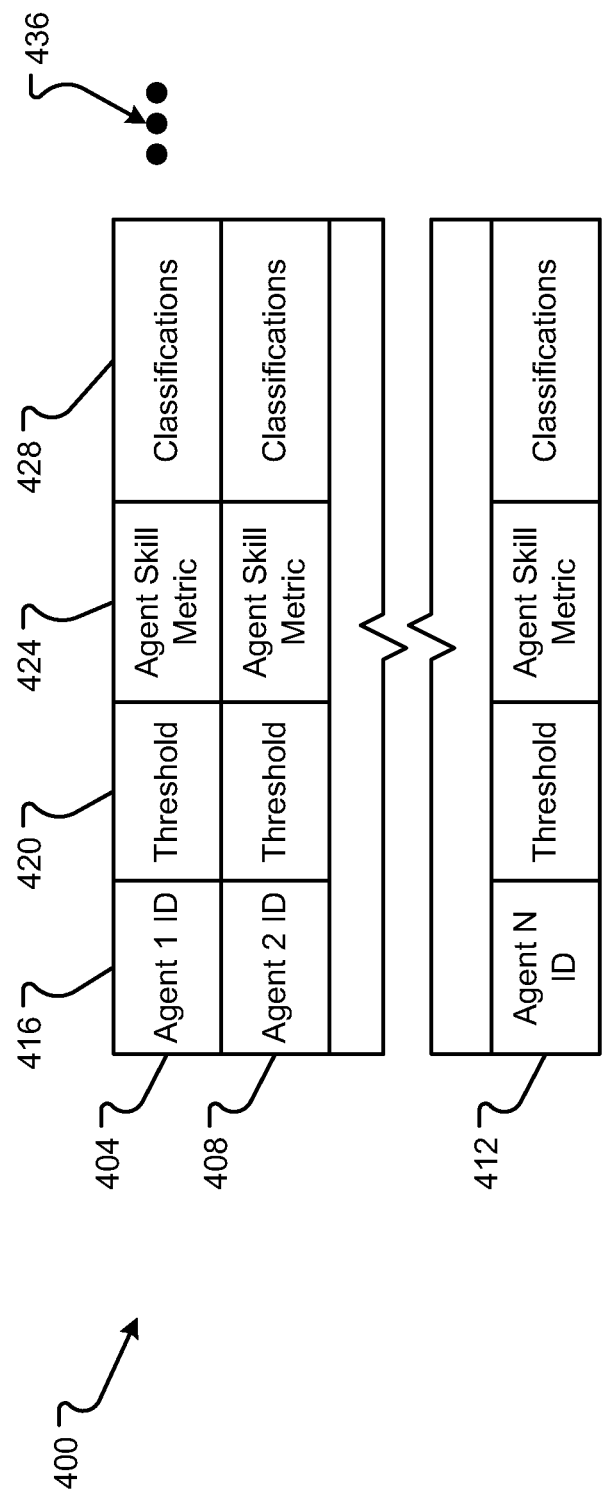
FIG. 4 is a block diagram of an embodiment of an agent vector data structure.
Figure 5:
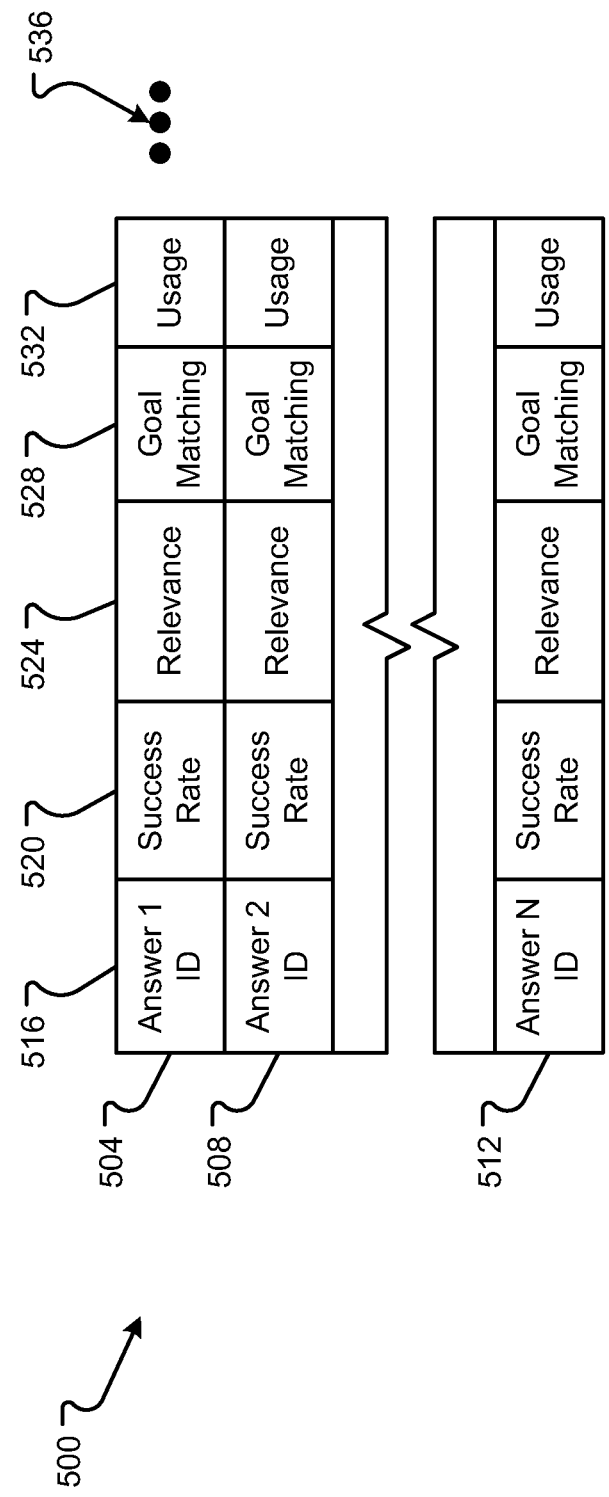
FIG. 5 is a block diagram of an embodiment of an answer analysis data structure.

The automatically generated answer may then be sent from the automated answer generator 304 to the answer based agent routing engine 316. The answer based agent routing engine 316 can analyze the automatically generated answer using data and information from an agent rules, vectors, models database 320 to determine a modified response 324 to the query. The can include information about the agents that may have been assigned or that will be assigned to administer the response 324. Further, the agent rules, vectors, models database 320 can include statistics or information about the automatically generated answer(s). An example of at least some of the information that may be stored in the agent rules, vectors, models database 320 may be as shown in FIGS. 4 and 5. An example of the answer based agent routing engine 316 may be as shown in FIG. 3B. The response 324 can be a different or modified question, a user interface for an agent, an agent routing decision, or other output that better manages the response to the query 300.

An embodiment of the answer based agent routing engine 316 is shown in FIG. 3B. The answer based agent routing engine 316 can include one or more components or modules which may be hardware, software, or a combination of hardware and software. The answer based agent routing engine 316 can be executed by a computer system such as those described in conjunction with FIGS. 8 and 9. However, in other embodiments, the components described in conjunction with FIG. 3B, are logic circuits or other specially-designed hardware that are embodied in a FPGA or ASIC. The answer based agent routing engine 316 can include an answer complexity calculator 332, an answer probability calculator 336, an agent selection engine 340, an agent router 344, an answer suggestion analysis module 348, a supervisor router 352, and/or a feedback performance module 356. While a perceived order of performance is implied by FIG. 3B, it should be noted that the calculations and analysis described herein may be performed in any order. Each of these modules will be explained further hereinafter.

An answer complexity calculator 332 can determine the complexity of the automatically generated answer. The answer complexity calculator 332 may calculate the complexity of the automatically generated answer using text processing methods, classification techniques, and other methods known in the art. The answer complexity calculator 332 can provide a complexity score associated with the automatically generated answer.

The answer complexity calculator 332 may provide the complexity score to the agent selection engine 340. Using the complexity score, the agent selection engine 340 can match an agent with an ability to answer queries of a predetermined complexity that is equal to or greater than the complexity score. In this way, the agent selection engine 340 can identify agents who can handle highly complex answers when required but which can draw from a much larger pool of agents, many of which can handle simpler and more common queries.

For example, when automatically generated answers are "simple," like Frequently Asked Questions (FAQ), a store location questing, a question about hours of operation, etc., then the complexity score is low, and most agents can validate that one of the suggested answers is correct. However, if the query is about a billing issue, a return, or specific customer inquiry, then that answer is more complex and will require an agent with more skill.

The answer probability calculator 336 can determine the probability of the automatically generated answer answering the question or query. The answer probability calculator 336 can generate a probability score using text processing and classification methods, where each class of answer has a probability of answering the question. With the probability score, the agent selection engine 340 can decide which agent might be suited to answering the question and can determine if the automated answer should be sent without agent oversight or if the automatically generated answer should be reviewed by an agent before being sent.

For example, a company may see two types of questions on social media: online shopping questions and requests for store locations. The agent selection engine 340 can receive a base answer probability (either derived or hard coded)—for example, online shopping questions may have 60% probability of being answered and location questions may have 90% probability of being answered. When an automatically generated answer for a store location has a high enough probability, the agent selection engine 340 may send the response without agent oversight. However, for automatically generated answer about online shopping, the agent selection engine 340 may evaluate attributes for the agents to determine a skills routing based on the automatically generated answer. Thus, if the hold time for a response is overnight, e.g., 6 hours, then the agent selection engine 340 may send the automatically generated answer at night even though the automatically generated answer has only a 60% chance of answering the question. In contrast, during staffed hours when an agent can be found to service and check the answer, the agent selection engine 340 can send the response to the agent.

The probability and complexity scores may be passed to the agent selection engine 340. The agent selection engine 340 can then compare these scores to agent threshold values (as described in conjunction with FIG. 4). Threshold values may be part of a vector associated with an agent that includes various threshold entries based on the classification of answers (i.e., a threshold for each type of answer). Agent vectors and other information may be stored in the agent rules, vectors, models database 320, which may be accessed by the agent selection engine 340. The comparison between thresholds and the probability and complexity scores helps further define the pool of available agents to address the received query. Thus, an agent may have a higher threshold (i.e., can only answer items with a high confidence score) for service items but may have a low threshold for sales items (i.e., can answer items with almost any level of confidence score)

In an example, four automatically generated answers may have complexity scores of 90, 80, 20, and 10, respectively. An experienced agent may have a threshold of 100 for the class of answers that have been generated, and the agent could send any one of the four answers based on his/her judgment. A junior or less experienced agent may have a threshold of 50. In this situation, if the junior agent chooses the third or fourth response, with complexity scores of 20 or 10, the agent router 344 may send the response. However, if the junior agent believes the first or second answers, with complexity scores of 90 or 80, then the agent router 344 may send the chosen answers to a supervisor router to have a supervisor check the agent's work through supervisor approval. If the junior agent's selection is correct according to the supervisor, he or she may be deemed more knowledgeable, and either the agent's threshold is increased or the probability score for the question is increased. In contrast, if he or she selects an incorrect answer, the agent's threshold may be lowered. Over time, the agent may develop a vector that shows the growth in knowledge for the agent in certain areas and whether the agent is an expert in certain areas or classes of answers and is still progressing in other areas. This vector information may be stored in the agent rules, vectors, models database 320. Based on the selection by the agent selection engine 340, the agent router 344 may then send or prepare the answer and query for an agent.

The agent router 344 may pass the agent output to a supervisor router 352. As explained above, the answer based agent routing engine 316 can include a dynamic feedback loop for agent evaluation which incorporates the activities of supervisor approval. Monitoring supervisor approval helps determine answer quality and agent skills. By continuously monitoring and storing information about which type of agents handle which type, classification, and/or complexity of answers, supervisor router 352 can modify or improve the vectors and metrics associated with the agents and/or the answers. As such, supervisor approvals or rejections are sent to a feedback performance module 356 for analysis. The feedback performance module 356 can analyze the supervisor responses and update the metrics stored in the agent rules, vectors, models database 320. Thus, the metrics are dynamically changed over time providing for increased accuracy in the determination of agents to be assigned future queries. The updated metric can be compared with the probability and complexity scores to properly route an automatically generated answer.

For example, when routing an answer for a specific function like domestic flight rebooking, a specific pool of agents may be more effective with rebooking than another set of agents. The efficacy of agent decision can be tracked by the correlation of decisions with supervisor approvals. Answer may then be routed to the agent pool that has the most success with that type of answer.

After routing through the supervisor router, a response 324 may be generated and sent to the customer, the agent, and/or the supervisor. The response 324 can be an answer, a user interface for an agent, or other output associated with the query. The response 324 may be created by one or more of the components of the answer based agent routing engine 316.

Figure 3C:
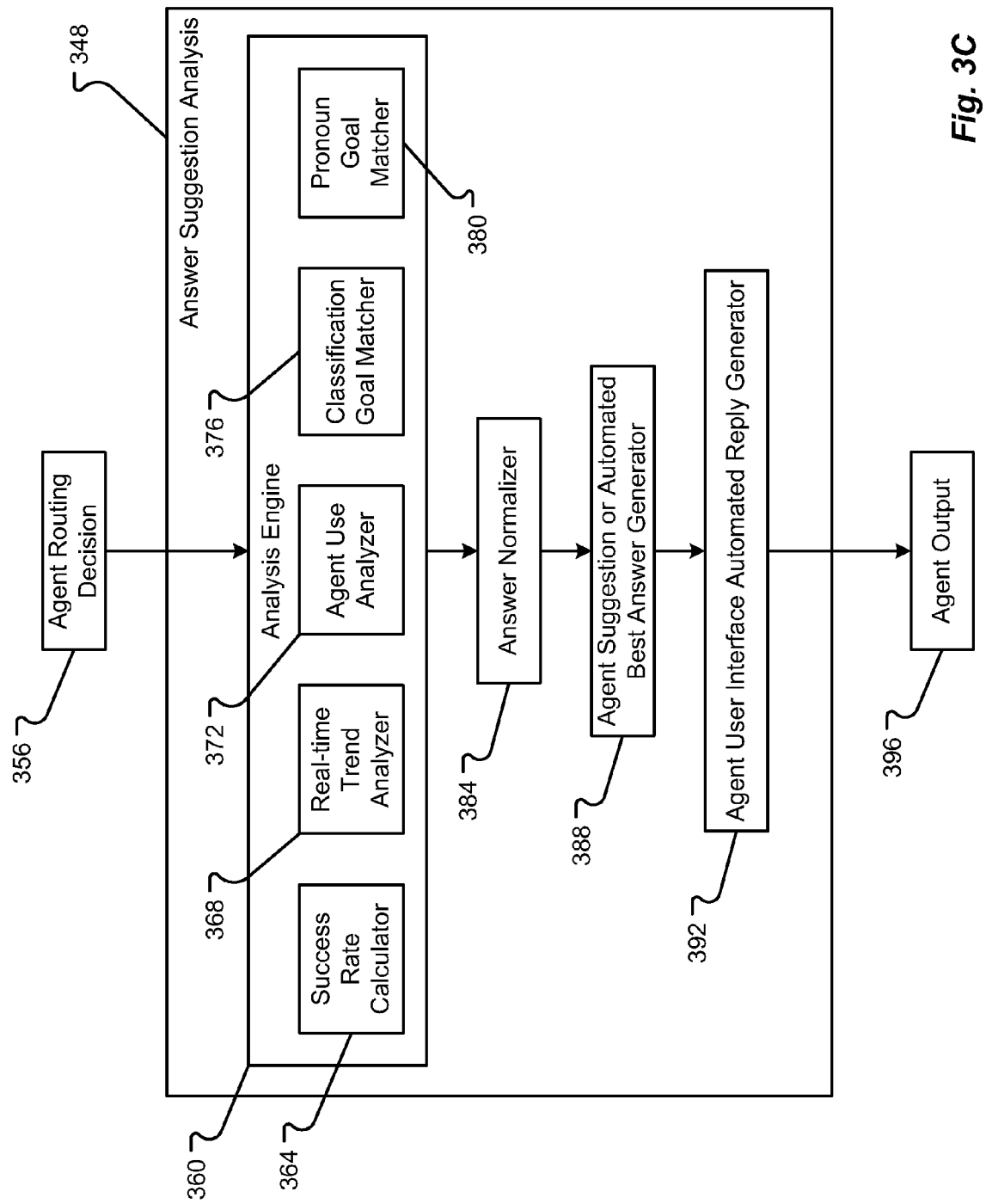
FIG. 3C is a block diagram of an embodiment of an answer suggestion analysis module.

During the evaluation process, the answer based agent routing engine 316 may employ the answer suggestion analysis module 348 to complete further analysis on the answer(s) and the pool of selected or identified agents. Thus, once a suitable agent is found for the incoming work item by the agent selection engine 340, the answer set/proposed answers can undergo another phase of analysis to optimize the final choices and improve the display for the selected agent. The answer suggestion analysis module 348 conducts the further analysis. An embodiment of the answer suggestion analysis module 348 is shown in FIG. 3C.

The answer suggestion analysis module 348 can include one or more components or modules which may be hardware, software, or a combination of hardware and software. The answer suggestion analysis module 348 can be executed by a computer system such as those described in conjunction with FIGS. 8 and 9. However, in other embodiments, the components described in conjunction with FIG. 3C, are logic circuits or other specially-designed hardware that are embodied in a FPGA or ASIC. The answer suggestion analysis module 348 can include an analysis engine 360, an answer normalize 384, an agent suggestion or automated best answer generator 388, and/or an agent user interface automated reply generator 392. While a perceived order of performance is implied by FIG. 3C, it should be noted that the calculations and analysis described herein may be performed in any order. Each of these modules will be explained further hereinafter.

The analysis engine 360 can receive the initial agent routing decision 356 from the agent router 344. The analysis engine 360 may then conduct one or more calculations or determinations. For example, the analysis engine 360 can include one or more of, but is not limited to a success rate calculator 364, a real-time trend analyzer 368, an agent use analyzer 372, a classification goal matcher 376, and/or a pronoun goal matcher 380. These calculations and determinations may aide in reducing or reordering the answer pool. The success rate calculator 364 can determine a success rate of each given answer or answer source. The success rate may be determined or calculated by conglomerating metrics, for example, first contact resolution rate, customer ratings in post call surveys, a rating of the number of dialog turns after the answer is given, and a possibly frequency of use of the answer by an agent when suggested.

The success rate metric may vary depending on the outgoing channel selection. Thus, the success rate may be associated with a channel selection and have a success rate for each answer for each channel selection. For example: answer #7 in an answer pool may have a higher success rate than answer #9 when the outgoing channel is Twitter but may have lower success rate when the outgoing channel is Facebook. Thus, answer #7 may have a higher probability of success when the agent is attempting to respond via Twitter.

The real-time trend analyzer 368 can rank the relevance of the answer to the current trends monitored in a real-time channel, such as social media. The real-time trend analyzer 368 can reorder responses to promote the most relevant answer as evidenced by trends in social media postings (e.g., postings receiving numerous hits in the day or week, most comments to a posting, etc.). Generally, the most relevant answer is most likely to succeed.

The agent use analyzer 372 can review answers suggestions that are more commonly used by other agents. Answers used by more experienced agents can be rated higher because these answers they have been validated by being selected by better agents. This metric helps inexperienced agents learn the answers used by the experienced agents.

A classification goal matcher 376 can evaluate the goal of the answer. An answer's goal can be defined in a three tier model, which consists of static answers, dynamic answers, and context required answers. When answers in the pool are static (i.e., the answer does not change based on the query), the likelihood of the answer being effective is increased. If an answer is dynamic (i.e., the answer changes based on the query or based on other factors), the probability of the answer being successful decreases. Finally, if the answer requires context information (i.e., the answer is based on information in the query), the answer may be least likely to succeed. The classification goal matcher 376 can order answers based on their likelihood of success from static answers to context-required answers. Goal matching is a weighting algorithm that impacts the score of the other metrics.

The pronoun goal matcher 380 can match personal pronoun to likelihood of knowing the information. If the pronouns indicate knowledge, the answer is more likely to be a success. For example, if the question is "your rates", then the question is second person and the answer must be knowable by the receiver. This pronoun match can be derived from the static answers or dynamic answers above. If the customer is asking about "my order", then the question is a first person request and the answer must be specific to that person and their "order". This pronoun matches the static or dynamic answers above and can indicate a known fact on a customer or dynamic information about the customer's order. The last category is the third party and would need to have been identified in the context of the dialog and would have to have some relationship to either the customer or the business. For example, the question may be "I talked to Apple about my damaged iPhone and they said I needed to talk to you." The pronoun resolution metric maps the tier model to be certain that generated answers or suggestions fit the correct response form. If the fit is correct, the answer has a higher probability of success.

The answer normalizer 384 can then receive the analysis results. The results are aggregated to help reorder the pool of answers/suggestions based on the combined score of the above. Thus, the normalize 384 can analyze the various results from the analysis engine 360 to determine an aggregate score for each answer. The aggregation may be done with weighted averages or other techniques known in the art. The aggregated score is passed to the agent suggestion or automated best answer generator 388. The automated best answer generator 388 can then reorder the answers and agent pool to provide the best to worst answer and the best to worst agent suggestions based on the combined scores. The list of answers and agents may then be sent to the agent user interface automated reply generator 392.

The agent user interface automated reply generator 392 may then compose an automated answer. Thus, if a determination is made that the answer has a high probability of success without agent involvement, the agent user interface automated reply generator 392 can create an automated answer to be sent without agent approval. In contrast, if agent involvement is needed, the agent user interface automated reply generator 392 can create the user interfaces for the agent to choose an answer. This information is then sent out as agent output 396.

An embodiment of an agent data or agent vector data structure 400 is shown in FIG. 4. The agent vector data structure 400 can be stored in several different forms of databases, such as relational databases, flat files, object-oriented databases, etc. Thus, while the term "data field" or "segment" is used herein, the data may be stored in an object, an attribute of an object, or some other form of data structure. Further, the agent vector data structure 400 can be stored, retrieved, sent, or received during answer based agent routing process. The agent vector data structure 400 stores one or more items of information in one or more segments. The numeric identifiers (e.g. 402, 404, etc.) shown in FIG. 4 can identify, the one or more segments.

The agent vector data structure 400 can include one or more segments, such as, agent 1 vector 404, agent 2 vector 408, and agent N vector 412. Each agent vector 404-412 can include data associated with an agent and describing the agent's abilities. The agent vectors 404-412 can include an agent identifier (ID) 416, a threshold 420, one or more agent skill metrics 424, and/or one or more classifications 428. There may be more or fewer fields in the agent vectors 404-412, as represented by ellipses 436.

The agent ID 416 can include any unique identifier that can uniquely identify an agent amongst all other agents. Thus, the agent ID 416 may be a globally unique identifier (GUID), a social security number, a name, a numeric or alphanumeric ID, etc. Thus, each vector 404-412 is associated with an agent based on the agent ID 416.

A threshold 420 is a measure of the ability of the agent. The threshold can be any metric that can be compared to the scores associated with automatically generated answers. In one example, the threshold 420 is a measure from 0 to 100 that can compare to a confidence interval of a probability that an answer will be successful. Each agent may have one or more thresholds that are associated with different classifications of answers, communication channels, etc.

An agent skill metric 424 can be another measure of an agent's skills. Unlike the threshold 420, the agent skill metric 424 may be used for other calculations and measure that are not related to the comparison with an automatically generated answer. Thus, the agent skill metric 424 may have a different format and value from the threshold 420. The agent skill metric 424 may be used to determine the expertise of an agent in a skill or with a type of query or answer. The analysis engine 460 may use the agent skill metric 424 for various calculations.

A classifications segment 428 may list the classifications for answers with which the agent has experience. Each classification 428 may have an associated threshold 420 or agent skill metric 424. A classification 428 is a definition of a type of answer. Classifications 428 are explained above in conjunction with the description of FIG. 3C.

An embodiment 400 of a data structure describing an automatically generated answer is shown in FIG. 4. The answer profiles 504, 508, 512 can include one or more data segments that contain one or more measures of the complexity and/or probability of success for an automatically generated answer. For example, answer profiles 504, 508, 512 can each include an answer ID 516, a success rate 520, a relevance measure 524, a goal matching measure 628, and a usage measure 532. The answer profiles 504, 508, 512 can include more or fewer segments than those shown in FIG. 5, as represented by ellipses 536.

The answer ID 516 can include any unique identifier that can uniquely identify an answer amongst all other answers. Thus, the answer ID 516 may be a GUID, a name, a numeric or alphanumeric ID, etc. Thus, each answer profile 504, 508, 512 is associated with an answer based on the answer ID 516.

A success rate 520 is a measure of the probability that an answer will be successful. The success rate 520 can be any metric that can be compared to the thresholds 420 associated with the agents. In one example, the success rate 520 is a confidence interval measure from 0 to 100 of a probability that an answer will be successful. Each answer may have one or more success rate 520 that are associated with different classifications of answers, communication channels, etc.

A relevance measure 524 can be a measure of how relevant the answer is based on real-time trends in social media. The relevance measure 524 can be a dynamic measure that adjusts to changes in social media trends. The trends may be measured by increases or decreases in occurrence of certain words, pictures, or other media. A relation to the trends may be made by word analysis or other calculations.

A goal matching measure 528 may measure the answer goal or pronoun goal. There may be more than one goal for an answer based on the type of answer. The goals are as explained above in conjunction with the description of FIG. 3C.

A usage measure 532 can measure the number of times an answer is used. The usage measures 532 can be associated with each outgoing channel and other delineations for the answers usage. The usage measure 532 may be a percentage or ratio for how often the answer is used when applicable, a count, or other type of measure.

Figure 6:
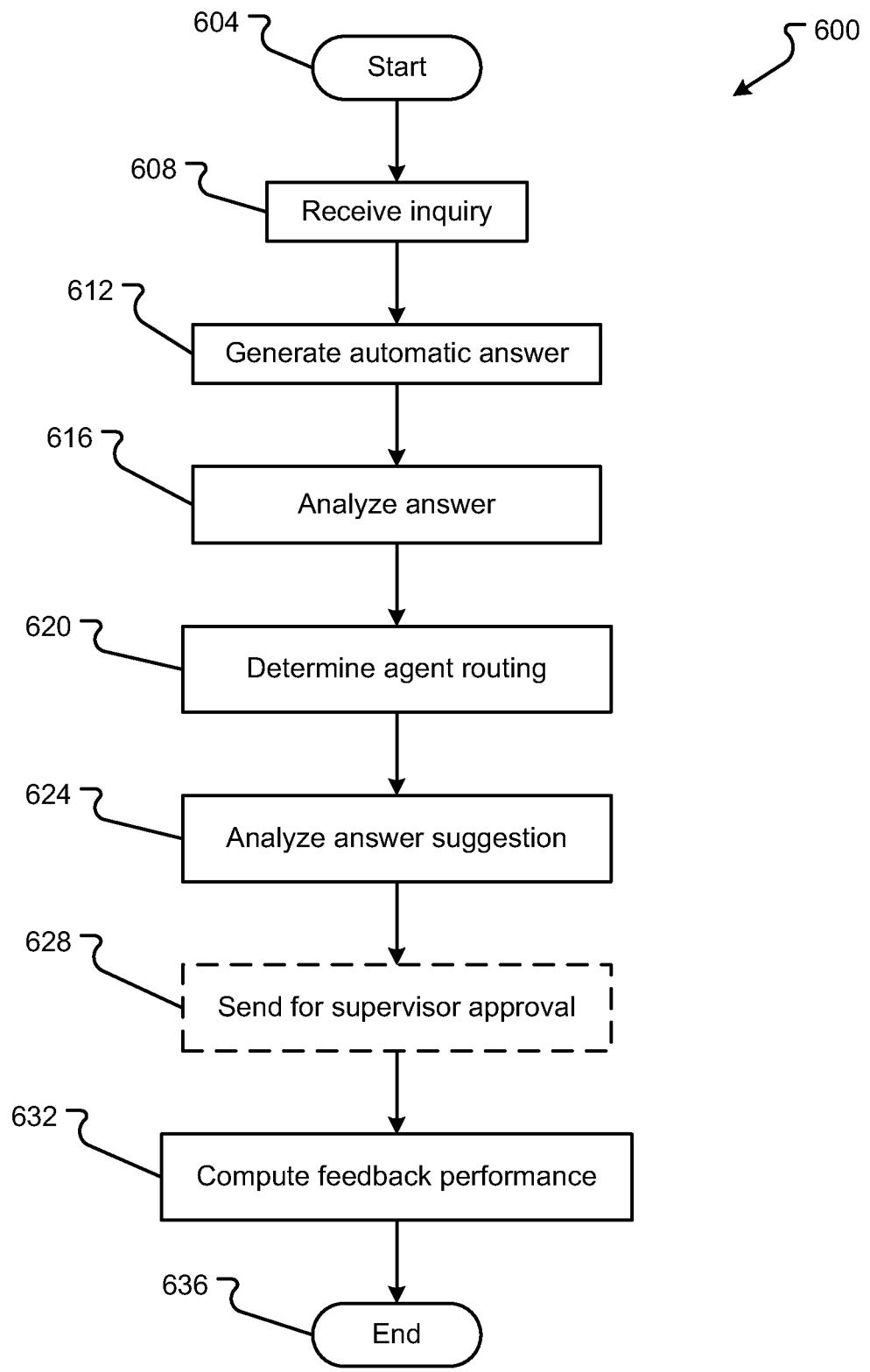
FIG. 6 is a flow diagram of an embodiment a process for routing queries to an agent based on automated answer analysis.

An embodiment of a method 600 for routing an inquiry to an agent based on analysis of an automatically generated answer is shown in FIG. 6. Generally, the method 600 begins with a start operation 604 and terminates with an end operation 636. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, software, data structures, etc. described in conjunction with FIGS. 1-5.

A contact center 102 can receive an inquiry, in step 604. The inquiry and be a question, suggestion, query, or other type of contact from a customer. In the embodiments provided herein, the contact may be made through a social media channel, an online chat, an email, an SMS message, a voice call or message, or a video call or message. The contact center 102 may then generate an automatic answer based on an analysis of the received inquiry, in step 612. The dialog system 104 can perform the analysis of the inquiry, and based on the analysis, generate one or more answers from the dialog core 210. The answer(s) can be automated in that no agent is involved in the process of creating the answer(s). The answer(s) may then be sent to the agent interface 224 for further processing. In other embodiments, the agent interface 224 receives the inquiry and, possibly, other data from the dialog core 210. An automated answer generator 304 in the agent interface 224 access answer sources 308 and/or answer generation models 312 to generate the automatic answer(s).

The automatic answer(s) may then be passed to the answer based agent routing engine 316. Upon receiving the automated answers(s), the answer based agent routing engine 316 can analyze the answer(s), in step 616. The analysis can include an answer probability calculator 336 determining or accessing, from a success rate field 520 of database 500, a probability that the answer(s) will be successful. Further, an answer complexity calculator 332 can determine how complex the answer(s) are. Other calculations may also be performed.

Based on the calculations, an agent selection engine 340 may determine a pool of agents used to route the answer(s), in step 620. The pool of possible agent may be passed to an agent router 344 to determine an ordered list of who to route the answer(s) and the inquiry for conducting the response. An answer suggestion analysis module 348 may conduct further analysis of the answer suggestion(s), in step 624. The answer suggestion analysis module 348 may make one or more determinations or calculations to better define the agent pool, the order of the agents to be sent the answer(s), the pool of answer(s), and/or the order in which the answers are preferred. The analysis may be as described in FIG. 7.

The agent router 344 may also pass the answer and agent information to the supervisor router 352. The supervisor router 352 may optionally determine to send the answer(s) and agent actions to a supervisor for supervisor approval, in step 628. Thus, either before or after action by an agent, the answer(s) and agent selection(s) of those answer(s) may be sent to a supervisor for review and a determination if the agent's actions and the agent's selection(s) are correct. The actions of the agent and supervisor and any other information about the process may then be sent to a feedback performance module 356. The feedback performance module 356 may then computer feedback performance of the process, in step 632. The post process feedback performance can further improve the statistics and data stored in the agent rules, vectors, models database 320 for future answer based analysis. Thus, the feedback performance module 356 can improve or update the statistics listed in the database 500.

Figure 7:
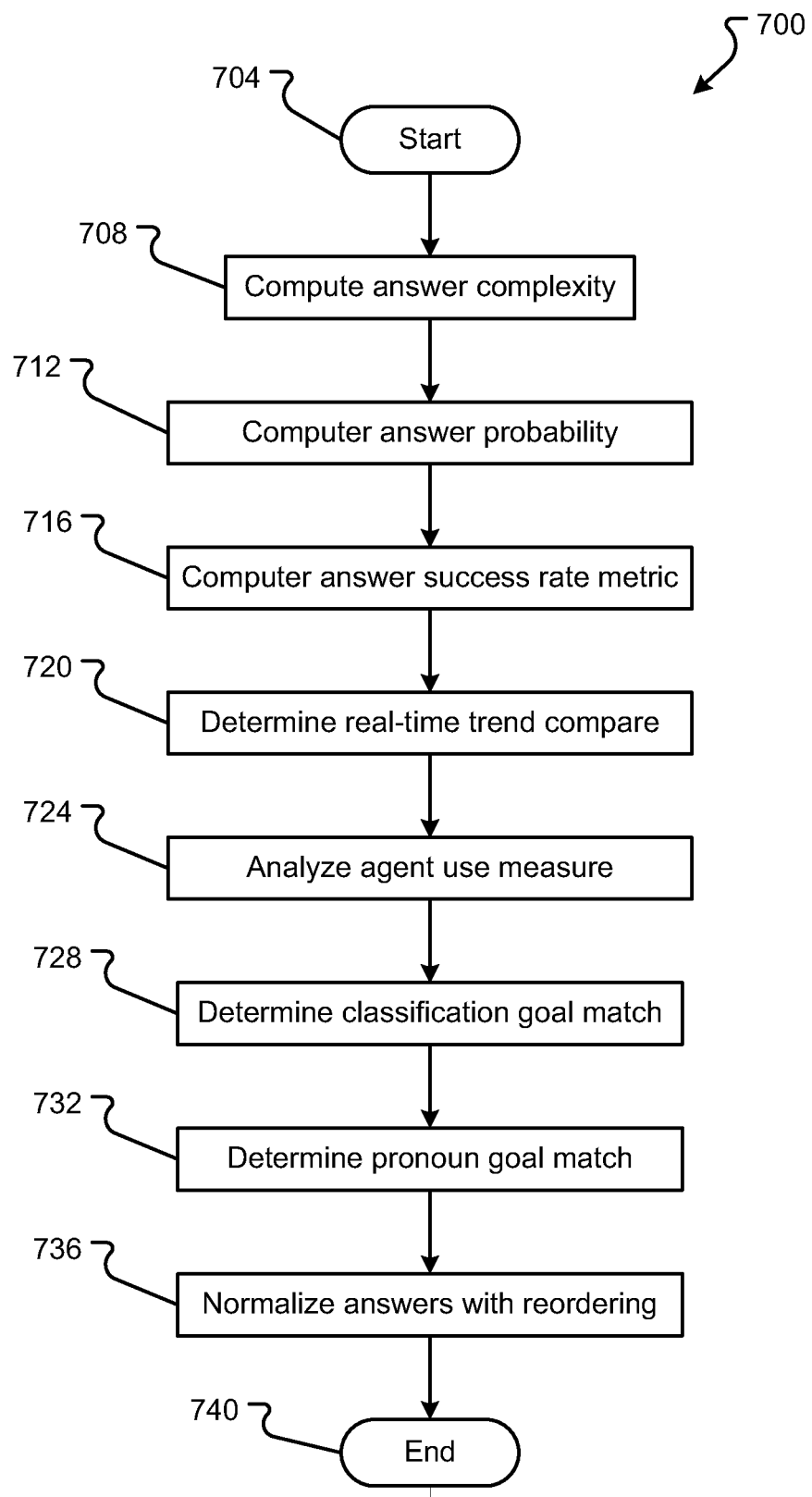
FIG. 7 is a flow diagram of an embodiment a process for answer based analysis.

An embodiment of a method 700 to analyze an answer suggestion is shown in FIG. 7. Generally, the method 700 begins with a start operation 704 and terminates with an end operation 740. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, etc. described in conjunction with FIGS. 1-6.

An answer complexity calculator 332 can determine how complex the answer(s) are, step 708. The complexity of an answer can be determined using text processing techniques. An answer probability calculator 336 can determine or access, from a success rate field 520 of database 500, a probability that the answer(s) will be successful, in step 712. The probability of success may be dynamically determine over time based on feedback to the answers that is analyzed and stored by a feedback performance module 356 into the success rate field 520 of the database 500.

A success rate calculator 364 may also calculate a success rate metric for the answer(s), in step 716. The success rate metric may include the probability calculation and/or measure other parameters. The success rate calculator 364 may also retrieve the success rate from field 520 of database 500. A real-time trend analyzer 368 can determine a real-time trend comparison, in step 720. As explained in conjunction with FIG. 3C, the real-time trend analyzer 368 can calculate or access a relevance score 524 that relates the answer to real-time trends monitored in social media. The real-time trends may be captured by the social media gateway 106 or the dialog core 104 and provide to the real-time trend analyzer 368.

An agent use analyzer 372 may analyze the agent use measure, in step 724. The agent usage measure 532 may indicate a number of times the answer(s) is used by an agent or type of agent. A classification goal matcher 376 can determine a classification goal match, in step 728. The classification goal match may be as described in FIG. 3C and/or may include retrieving goal matching data from field 528 of database 500. Further, a pronoun goal matcher 380 may determine a pronoun goal match, in step 732. Like the classification goal matching, the pronoun goal matching may be as described in FIG. 3C and/or may include retrieving goal matching data from field 528 of database 500.

With the calculations above, an answer normalize 364 can normalize the answers and an agent suggestion or automated best answer generator 388 can reorder the agents and/or answer suggestions, in step 736. In embodiments, the answer normalize 364 calculates a combined score from the information above to provide to the agent suggestion or automated best answer generator 388, The agent suggestion or automated best answer generator 388 uses the combined score to reorder the agent suggestions and answer suggestions. The agent and answer suggestions are then provided to the agent user interface automated reply generator 392 to send the appropriate response to the inquiry.

FIG. 8 illustrates a block diagram of a computing environment 800 that may function as servers, computers, or other systems provided herein. The environment 800 includes one or more user computers 805, 810, and 815. The user computers 805, 810, and 815 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin-client computer, Internet-enabled mobile telephone, and/or personal digital assistant, capable of communicating via a network 820 and/or displaying and navigating web pages or other types of electronic documents. Although the exemplary computer environment 800 is shown with three user computers, any number of user computers may be supported.

Environment 800 further includes a network 820. The network 820 may can be any type of network familiar to those skilled in the art that can support data communications using any of a variety of commercially-available protocols, including without limitation SIP, TCP/IP, SNA, IPX, AppleTalk, and the like. Merely by way of example, the network 820 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system may also include one or more server 825, 830. In this example, server 825 is shown as a web server and server 830 is shown as an application server. The web server 825, which may be used to process requests for web pages or other electronic documents from user computers 805, 810, and 815. The web server 825 can be running an operating system including any of those discussed above, as well as any commercially-available server operating systems. The web server 825 can also run a variety of server applications, including SIP servers, HTTP servers, FTP servers, CGI servers, database servers, Java servers, and the like. In some instances, the web server 825 may publish operations available operations as one or more web services.

The environment 800 may also include one or more file and or/application servers 830, which can, in addition to an operating system, include one or more applications accessible by a client running on one or more of the user computers 805, 810, 815. The server(s) 830 and/or 825 may be one or more general purpose computers capable of executing programs or scripts in response to the user computers 805, 810 and 815. As one example, the server 830, 825 may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests from database clients running on a user computer 805.

The web pages created by the server 825 and/or 830 may be forwarded to a user computer 805 via a web (file) server 825, 830. Similarly, the web server 825 may be able to receive web page requests, web services invocations, and/or input data from a user computer 805 and can forward the web page requests and/or input data to the web (application) server 830. In further embodiments, the web server 830 may function as a file server. Although for ease of description, FIG. 6 illustrates a separate web server 825 and file/application server 830, those skilled in the art will recognize that the functions described with respect to servers 825, 830 may be performed by a single server and/or a plurality of specialized servers, depending on implementation-specific needs and parameters. The computer systems 805, 810, and 815, web (file) server 825 and/or web (application) server 830 may function as the system, devices, or components described in FIGS. 1-4.

The environment 800 may also include a database 835. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. The database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. The database 8 35 may be a relational database, such as Oracle 10i™, that is adapted to store, update, and retrieve data in response to SQL-formatted commands.

FIG. 9 illustrates one embodiment of a computer system 900 upon which the servers, computers, or other systems or components described herein may be deployed or executed. The computer system 900 is shown comprising hardware elements that may be electrically coupled via a bus 955. The hardware elements may include one or more central processing units (CPUs) 905; one or more input devices 910 (e.g., a mouse, a keyboard, etc.); and one or more output devices 915 (e.g., a display device, a printer, etc.). The computer system 900 may also include one or more storage devices 920. By way of example, storage device(s) 920 may be disk drives, optical storage devices, solid-state storage devices such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. The computer system 900 may also include a processing acceleration unit 935, which can include a DSP, a special-purpose processor, and/or the like.

The computer-readable storage media reader 925 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 820 (FIG. 8) and/or any other computer described above with respect to the computer system 900. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 900 may also comprise software elements, shown as being currently located within a working memory 940, including an operating system 945 and/or other code 950. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments have been described in detail herein, it is to be understood that the inventive concepts may be otherwise variously embodied and employed, and that the appended claims are intended to be construed to include such variations, except as limited by the prior art.

What is claimed is:

1. A method for determining an agent routing in a contact center, the method comprising:
   receiving, by a processor, an inquiry from a consumer;
   generating, by the processor, substantive content for one or more automatically generated answers that respond to the inquiry;
   analyzing the one or more automatically generated answers; and
   based on the analysis, determining the agent routing.

2. The method as defined in claim 1, wherein the inquiry is received through one of a social media channel, an online chat, an email, an SMS message, a voice call or message, or a video call or message.

3. The method as defined in claim 1, wherein an automated answer generator generates the automatically generated answer based on at least one of an answer sources database and an answer generation models database.

4. The method as defined in claim 1, wherein analyzing the one or more automatically generated answers includes determining an answer complexity for each of the one or more automatically generated answers.

5. The method as defined in claim 4, wherein analyzing the one or more automatically generated answers includes determining an answer probability for each of the one or more automatically generated answers.

6. The method as defined in claim 5, wherein, based on at least one of the answer complexity and the answer probability, determining the agent routing.

7. The method as defined in claim 6, further comprising analyzing the one or more automatically generated answers.

8. The method as defined in claim 7, wherein analyzing the one or more automatically generated answers comprises one or more of:
   computing an answer success rate metric;
   determining a real-time trend comparison;
   analyzing an agent usage measure;
   determining a classification goal match; and
   determining a pronoun goal match.

9. The method as defined in claim 8, further comprising normalizing the one or more automatically generated answers based on the analysis.

10. The method as defined in claim 9, further comprising based on at least one of the answer complexity and the answer probability, determining which of the one or more automatically generated answers can be sent by an agent and which of the one or more automatically generated answers require supervisor approval to be sent.

11. The method as defined in claim 10, further comprising computing feedback performance on one or more automatically.

12. A non-transitory computer readable medium having stored thereon processor executable instructions that cause a computing system to execute a method for generating an agent routing, the instructions comprising:
   instructions to receive an inquiry from a customer on a social media channel, an online chat, an email, an SMS message, a voice call or message, or a video call or message;
   instructions to analyze the inquiry;
   based on the analysis of the inquiry, instructions to generate two or more automatically generated answers that respond to the inquiry;
   instructions to analyze the two or more automatically generated answers;
   based on the analysis of the two or more automatically generated answers, instructions to determine the agent routing;
   instructions to analyze the two or more automatically generated answers and the agent routing; and
   based on the analysis of the two or more automatically generated answers and the agent routing, instructions to modify one or more of the two or more automatically generated answers and the agent routing.

13. The non-transitory computer readable medium as defined in claim 12, further comprising:
   instructions to send the two or more automatically generated answers for supervisor approval; and
   instructions to compute feedback performance on the two or more automatically generated answers.

14. The non-transitory computer readable medium as defined in claim 13, wherein the analysis of the two or more automatically generated answers and the agent routing comprises:
   instructions to compute an answer success rate metric;
   instructions to determine a real-time trend comparison;
   instructions to analyze an agent usage measure;
   instructions to determine a classification goal match;
   instructions to determine a pronoun goal match;
   instructions to normalize the two or more automatically generated answers based on the analysis; and
   instructions to reorder the two or more automatically generated answers based on the normalization of the two or more automatically generated answers.

15. The non-transitory computer readable medium as defined in claim 14, wherein the analysis of the two or more automatically generated answers comprises at least one of:
   instructions to determine an answer complexity for each of the one or more automatically generated answers; and
   instructions to determine an answer probability for each of the one or more automatically generated answers.

16. A communication system comprising:
   a social media gateway in communication with a social media network, the social media gateway receiving an inquiry, from a customer, on the social media network;
   a dialog system in communication with the social media gateway, the dialog system determining an agent routing for the inquiry, wherein the dialog system compromises:
   an agent interface that receives and analyzes the inquiry, wherein the agent interface compromises:
   an automated answer generator that generates substantive content for one or more automatically generated answers to the inquiry; and
   an answer based agent routing engine in communication with the automated answer generator, wherein the answer based agent routing engine:
   analyzes the one or more automatically generated answers; and
   based on the analysis, generates an agent routing.

17. The communication system as defined in claim 16, further comprising:
   an answer sources database in communication with the automated answer generator, wherein the answer sources database is operable to provide the one or more automatically generated answers; and an answer generation models database in communication with the automated answer generator, wherein the answer generation models database is operable to provide one or more heuristics to analyze the inquiry to provide the one or more automatically generated answers.

18. The communication system as defined in claim 16, wherein the answer based agent routing engine comprises:

an answer complexity calculator operable to calculate the complexity of the one or more automatically generated answers;

an answer probability calculator operable to calculate the probability of the one or more automatically generated answers;

an agent selection engine operable to select one or more agents to manage the inquiry based on the complexity and probability of the one or more automatically generated answers;

a agent router operable to route the inquiry and the one or more automatically generated answers to at least one of the selected one or more agents;

an answer suggestion analysis module operable to further analyze the one or more automatically generated answers and the selected one or more agents and to modify the selection of the one or more agents and the one or more automatically generated answers;

a supervisor router operable to route the inquiry and the one or more automatically generated answers to at least one supervisor; and a feedback performance module to analyze feedback associated with the one or more automatically generated answers.

19. The communication system as defined in claim 18, wherein the answer suggestion analysis module comprises:

an analysis engine operable to analyze the one or more automatically generated answers and the selected one or more agents;

an answer normalizer operable to create a combined score for the analysis performed by the analysis engine;

an agent suggestion or automated best answer generator operable to modify the selection of the one or more agents and the one or more automatically generated answers based on the combined score; and an agent user interface automated reply generator operable to provide an agent output based on the modified selection of the one or more agents and the modified one or more automatically generated answers.

20. The communication system as defined in claim 18, wherein the a analysis engine comprises:

a success rate calculator operable to calculate the success rate for the one or more automatically generated answers;

a real-time trend analyzer operable to determine a correlation to a real-time social media trend for the one or more automatically generated answers;

an agent use analyzer operable to determine a number of times each of the one or more automatically generated answers were used previously by agents;

a classification goal matcher operable to determine if each of the one or more automatically generated answers match a classification goal; and a pronoun goal matcher operable to determine if each of the one or more automatically generated answers match a pronoun goal.

* * * * *